Figure 1:
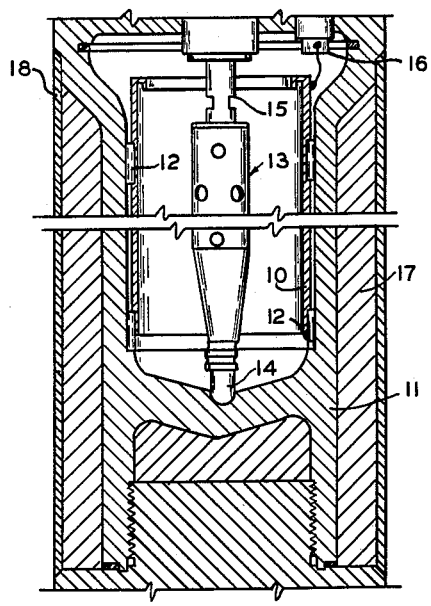

Feb. 2, 1960   G. SWIFT   2,923,825
APPARATUS FOR NEUTRON WELL LOGGING
Filed Feb. 8, 1954

INVENTOR.
GILBERT SWIFT
BY
ATTORNEY

United States Patent Office 2,923,825
Patented Feb. 2, 1960

2,923,825

APPARATUS FOR NEUTRON WELL LOGGING

Gilbert Swift, Tulsa, Okla., assignor to Well Surveys, Inc., a corporation of Delaware Application February 8, 1954, Serial No. 412,195

1 Claim. (Cl. 250—83)

This invention relates to the art of subsurface exploration, principally oil well logging, and more particularly to a radioactivity type of exploration in which a source of fast neutrons is used in conjunction with a gamma-ray detector. Commercially such a radioactivity log made by the use of a source of fast neutrons and a gamma-ray detector is known as a neutron log. This is true despite the fact that no neutrons are directly detected.

In recent years neutron oil well logs have achieved a degree of popularity not shared by the logs made by other methods. This is believed to be attributable to the fact that, in a substantial proportion of surveys made, they correlate more accurately with the lithology of the strata penetrated by the well. These logs have been made by traversing the well with a source of neutrons, usually 300 to 500 millicuries of radium intimately mixed with a predominant proportion by weight of powdered beryllium, to irradiate with fast neutrons the strata lining the well and simultaneously traverse the well with an associated gamma-ray detector to detect and record gamma rays in correlation with the depth at which they are detected. The detector, for example an ionization chamber, and the source are assembled to make a single unit, with the detector vertically spaced from the source.

By extensive experimentation it has been discovered that the neutron log does not, in many important instances, adequately depict the lithologic properties of the strata surveyed. Numerous instances of this kind have been carefully investigated and correlated and, as a result of exhaustive study and experimentation, a solution to this problem has been found, resulting in the discovery of how to make adequate neutron logs of oil wells, and analogous subsurface passages, in virtually all instances.

One of the facts which has been discovered is that prior workers have not, in making and interpreting their logs, taken into consideration the variation in scattering from point to point in the well of the primary gamma radiation emitted by the neutron source and detected by the ionization chamber along with the gamma radiation resulting from the neutron processes occurring in the strata. This has been found to be a very important factor.

The radium-beryllium source, which has been accepted as a standard neutron source by those working in the art, is composed of an alpha rayer in the form of radium, atomic number 88 and mass number 226, in secular equilibrium with its daughter products, intimately mixed with a target material, beryllium. The mixture is enclosed in a metallic capsule which in turn is surrounded by a lead shield made as thick as practical, the diameter of the wells to be logged being the limiting factor. The lead shield is used as an attenuator of gamma radiation which is emitted by the source mixture along with the neutrons. However, such a source emits gamma radiation far in excess of that which is permissible in making uniformly good logs under various well conditions.

The effect of gamma-rays naturally emitted by the strata penetrated by a well has also been investigated, and the ionizing processes which they cause to occur in the detector were found to be ordinarily small in comparison with those occurring due to the primary radiation when a conventional source of neutrons sufficiently strong for satisfactory logging is used. Therefore, no further reference will be made to them in this application.

In addition to the above mentioned discovery that primary gamma radiation from the radium-beryllium source is responsible in an important way for serious inadequacies in the logs, it has been discovered further that a good neutron log can be made in virtually any bore hole by employing an adequately shielded neutron source which has been critically spaced from the detector and at the same time using a shield about the detector which will attenuate scattered gamma radiation which has arisen with the neutron source but yet will pass the more intense gamma radiation originating with neutron interactions in the formations.

If radium, atomic number 88 and mass number 226, could be maintained in a pure state it would be ideally suited for use in a neutron source, because it does not emit gamma radiation which would be scattered by the formations and reach the detector. Radium, however, does not remian in a pure state for the reason that it is continually decaying to form daughter products, some of which are strong gamma rayers. Radium therefore goes into secular equilibrium with its daughter products. The nuclear processes which are continually taking place in radium are as follows:

Radium, atomic number 88 and mass number 226, is an alpha rayer which emits alpha rays of from 4 to 5 m.e.v. energy and in so doing decays to form radon, a gas. Radon also emits alpha radiation. The capsule in which the source material is contained retains this radon gas as it is formed and it goes to equilibrium. Radon is a powerful alpha rayer, giving off alpha rays of 6 m.e.v. energy. In emitting alpha rays of this energy it decays to radium A, which is also an alpha rayer. Radium A, by the emission of alpha radiation, decays to radium B. Radium B is a beta and a gamma rayer. The energy of the gamma radiation given off by radium B is approximately 2.1 m.e.v. Radium B decays into radium C which is, for the greater part, also a beta rayer and gamma rayer. The gamma radiation given off by radium C has an energy of about 1.8 m.e.v. 99.65 percent of radium C decays by the emission of beta radiation to form radium C′, and the remaining 0.35 percent decays by the emission of both alpha and gamma rays to form radium C″. The energy of the gamma radiation given off in this reaction is approximately 1.8 m.e.v. Radium C′, by the emission of alpha radiation, decays to form radium D, and radium C″, by the emission of beta radiation, also decays to form radium D. Radium D decays by the emission of beta and gamma radiation to form radium E. This gamma radiation is very soft, having an energy of only 0.047 m.e.v. Radium E, by the emission of beta radiation, decays to form radium F, and radium F in turn, by the emission of alpha radiation, decays to form lead, atomic number 82 and mass number 206, which is stable.

Since all of the elements between radium and lead are in secular equilibrium, it can be seen that there are present some daughter products which emit hard gamma radiation which cannot be greatly attenuated by a lead shield of practical dimensions which would fit into a well. Those hard gamma rays which are not absorbed by the shield enter the walls of the well and are scattered, thereby and some of them reach the detector where they are detected.

The beta radiation emitted by certain of the above daughter products when stopped by a target material produces gamma rays of about 600,000 volts energy. This action is comparable to that of an X-ray tube, the stopping material being the target. The chances of stopping a beta ray to produce gamma rays are, however, small, about one in 1000, and this phenomena is not of significant importance in the neutron logging process.

The nuclear reaction which occurs in the source capsule which produces fast neutrons is $_2$He$^4$ (alpha particles) + $_4$Be$^9$ (beryllium) → $_6$C$^{12}$ (carbon) + $_0$N$^1$ (neutron) + $h\mu$ (gamma radiation)

The neutrons produced by the above reaction have an average energy of approximately 5 m.e.v. For every neutron produced by the above reaction a photon of gamma radiation having an energy of approximately 3 m.e.v. is produced. Gamma radiation of this energy cannot be filtered with a practical amount of lead shield, commensurate with drill hole dimensions, to less than one gamma photon to four neutrons.

These last mentioned two sources of gamma radiation, viz., gamma rays produced by beta ray and alpha ray impingement on target material, are weak enough to be tolerable in good neutron logging. The gamma radiation which is not weak enough to be tolerable is that originating with the equilibrium mixture of the radium and its daughter products. To summarize, the significant gamma radiation emitted by the radium-beryllium source is, first, gamma radiation originating with the radium and its daughter products of approximately 2 m.e.v. energy, and, second, gamma radiation resulting from the nuclear reaction of the alpha rays and beryllium of approximately 3 m.e.v. The gamma rays given off by the radium and its daughter products are about 5000 times more numerous than the neutrons produced by the nuclear reaction of alpha rays and beryllium.

With a practical thickness of lead shield surrounding a radium-beryllium source, about 1000 of the gamma rays per neutron are emitted from the exterior of the shield. This gamma radiation is scattered by the formations in the vicinity of the source and some of the scattered radiation reaches the detector in varying amounts and is recorded, along with the desired gamma radiation produced by neutron reactions in the strata. In many cases, the scattered gamma radiation reaching the detector is substantially constant for all portions of the well. In these cases neutron logs can be made, as heretofore, with the radium-beryllium source, which are reliable and which truly correlate with the geology of the strata penetrated by the wells. This is due to the fact that the ionizing processes occurring in the detector which are produced by the scattered gamma rays are at a substantially constant rate resulting in a correspondingly constant flow of output current in the electrode circuit of the detector. Under these circumstances the ionizing processes in the detector produced by the desired gamma radiation resulting from neutron reactions in the strata, and which vary in rate in accordance with lithological characteristics of the strata, will be superimposed on those due to the scattered gamma radiation which originates in the neutron source. The output current from the detector then is composed of two components: one of substantially constant magnitude, that due to detected scattered gamma radiation, and one varying in magnitude in accordance with the lithological characteristics of the strata, that due to gamma radiation produced by neutron reactions occurring in the strata. Only in bore holes which behave as described above, prior to this invention, could a neutron log be made with a standard neutron source that accurately represented the lithological characteristics of the formations. There was no way of determining from the log itself before, during, or after the making of the log if the well was one of this type. This is a very important consideration, because frequently there is no way of knowing whether the log is or is not an accurate log.

Usually while logging with a radium-beryllium source the gamma radiation emitted by the source is scattered by the walls of the wells and reaches the detector in an amount which depends upon the size of the boring, the character of the rocks (largely density), the thickness of the casing, the density of fluid in the well, and possibly to a small extent upon other factors. Since these factors vary with depth in a manner which does not necessarily agree with, but is often opposite to, the properties of the formations which cause the neutron reactions, the result is to obscure, nullify, and often reverse the deflections of the log that are due to detected gamma rays which are produced by neutron reactions in the formations. In particular, all moderately small deflections are subject to suspicion since ordinarily it cannot be determined whether they are due to changes in the porosity or other factors affecting the neutron reactions in the formations or are due to slight changes in diameter of the well, density of the formations, etc. which change the amount of scattered gamma radiation.

Therefore it becomes apparent that the problem confronting those working in the art is to obtain a log while using a standard neutron source in which log the variations of the detected gamma radiation, resulting from neutron reactions occurring in the formations, are sufficiently greater than the variations of detected scattered gamma radiation which originates with the neutron source, that the desired lithological characteristic of the formations, as depicted by the gamma radiation resulting from the neutron reactions in the formation, will not be obscured. It is important that this problem be solved without resorting to the use of expensive or relatively rare neutron-producing reactant materials.

In addition to providing the neutron source with a gamma-radiation attenuating shield and critically spacing the source from the detector, it has been discovered that the effect of scattered gamma radiation can be further reduced by employing a gamma-radiation attenuating shield about the detector.

Figure 2:
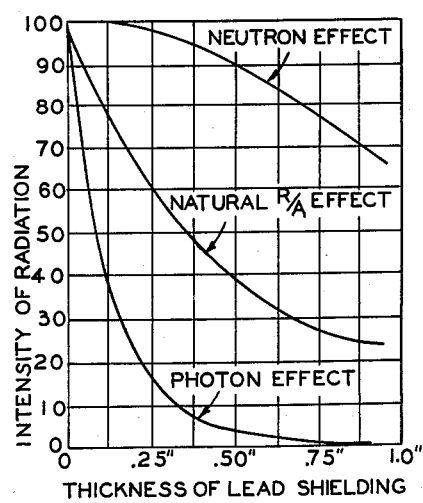

Therefore, the primary object of this invention resides in the provision of a method and apparatus for making a neutron-gamma-ray log of any well. A more specific object of this invention is to provide a shield for the detector portion of a neutron-gamma-ray logging instrument that will attenuate gamma radiation which has been emitted by the neutron source and which has reached the detector after having been scattered by the wall of the well and yet pass the gamma radiation produced by neutron interactions in the formations. Other objects and advantages of the present invention will become apparent from the following detailed description when considered with the drawings, in which:

Figure 1 is a fragmentary vertical sectional view of a gamma radiation detector of the type contemplated by the instant invention showing a shield thereon; and Figure 2 is a system of curves which have been plotted with thickness of detector shield as abscissae and percent intensity of detected radiation as ordinates.

Referring to the drawings in detail, particularly to Figure 1, an ionization chamber type detector is illustrated. An outer electrode 10 is supported in, but insulated from, the housing 11 by suitable insulators 12. Housing 11 may be constructed of steel having sufficient thickness to resist pressures encountered in deep drill holes. A central electrode 13 is axially disposed within the outer electrode 10 and supported at its bottom by an insulator 14 and at its top by insulator 15 which may be provided with a suitable lead-through conductor by means of which connection can be made to elements outside of the ionization chamber. Outer electrode 10 is also provided with an insulated lead-through 16 by means of which connection can be made to the outer electrode. It is to be understood that the chamber defined by the housing 11 contains a suitable ionizable medium such as argon under a suitable pressure.

Disposed about the housing 11 is a shield 17. Shield 17 is of critical thickness and formed of a material preferably of high atomic number. When the shield 17 is formed of a soft metal, such as lead, it is desirable to enclose it in a protective envelope 18 made of steel.

It is found that a shield of lead or tungsten greatly reduces the ionization occurring in the detector caused by gamma-rays emitted by the source and scattered by the formations while the ionization caused by processes involving emitted neutrons are very slightly attenuated if at all. Thus as shielding material is added to the detector the ratio of the wanted to unwanted radiation reaching the sensitive region improves.

Another effect of this shield material is to reduce the ionization produced by natural radioactivity of formations, thus variations of this activity cause less effect and the results more closely approach the desired aim of making a log representative only of the effects produced by natural bombardment.

It has been found, as illustrated by the curves of Figure 2, and particularly the curve marked "Neutron effect," that as the thickness of lead surrounding the detector is increased from zero up to 3/8" there is no appreciable reduction in amount of ionization caused by the neutron processes, but beyond this thickness attenuation rapidly sets in. On the other hand, as the thickness varies from zero upwards the attenuation of the unwanted scattered gamma radiation increases approximately exponentially, as shown in the curve labeled "Photon effect," at such a rate that it is reduced to 50 percent by a thickness of 3/32", to 10 percent by a thickness of 5/16", and to the order of 1 percent by a thickness of 5/8". As can be seen by comparing the curve marked "Neutron effect" with that marked "Photon effect" using a shield 5/8" thick results in only 17 percent reduction of the neutron effect detected, while the effect of the scattered gamma radiation effect is 99 percent eliminated.

At the same time, as shown in the curve marked "Neutron effect," increasing the thickness of the shield reduces the response of the detector to natural radioactivity of the surrounding formations in an approximately exponential manner such that a thickness of 5/8" of lead removes all but 32 percent of the natural radioactivity.

In a relatively slim well-logging instrument it is often impractical to use a thickness of shielding as great as 5/8" since this thickness of shield may result in too small a detector. In such cases it is necessary to compromise by reducing the shield thickness to a more practical value which permits use of an adequate size of detector yet still permits a shield thickness having considerable attenuation of the unwanted radiation. For example, a lead shield 7/16" thick, as can be seen by comparing the three curves, causes only 7.5 percent diminution of the neutron effect but eliminates approximately 55 percent of the natural radioactivity effect and all but 5 percent of the photon or scattered gamma-ray effect.

Although the shield for the detector has been described in detail above as being formed of lead, other materials from which the detector shield may be made are lead tungsten, tantalum, nickel, cobalt, rhodium, ruthenium and palladium.

I claim:

A subsurface neutron logging instrument that comprises a neutron source emitting a substantial number of gamma rays, a detector of gamma radiation having a detecting medium and spaced from said neutron source and a substantially cylindrical shield disposed about said detecting medium, said shield being formed substantially of metal at least as dense as lead, having a thickness of from five-tenths to one and one-half centimeters, and extending substantially beyond the detecting medium in the direction of said neutron source.

References Cited in the file of this patent

UNITED STATES PATENTS

| | | |
|---|---|---|
| 2,345,119 | Hare | Mar. 28, 1944 |
| 2,470,224 | Scherbatskoy | May 17, 1949 |
| 2,508,772 | Pontecorvo | May 23, 1950 |
| 2,522,522 | Krasnow | Sept. 19, 1950 |
| 2,580,360 | Morrison | Dec. 25, 1951 |